Oct. 27, 1931.  E. T. FERNGREN  1,829,640
METHOD AND APPARATUS FOR FORMING SHEET GLASS
Original Filed March 24, 1924   2 Sheets-Sheet 1

INVENTOR.
Enoch T. Ferngren.
C. A. Rowley
ATTORNEY.

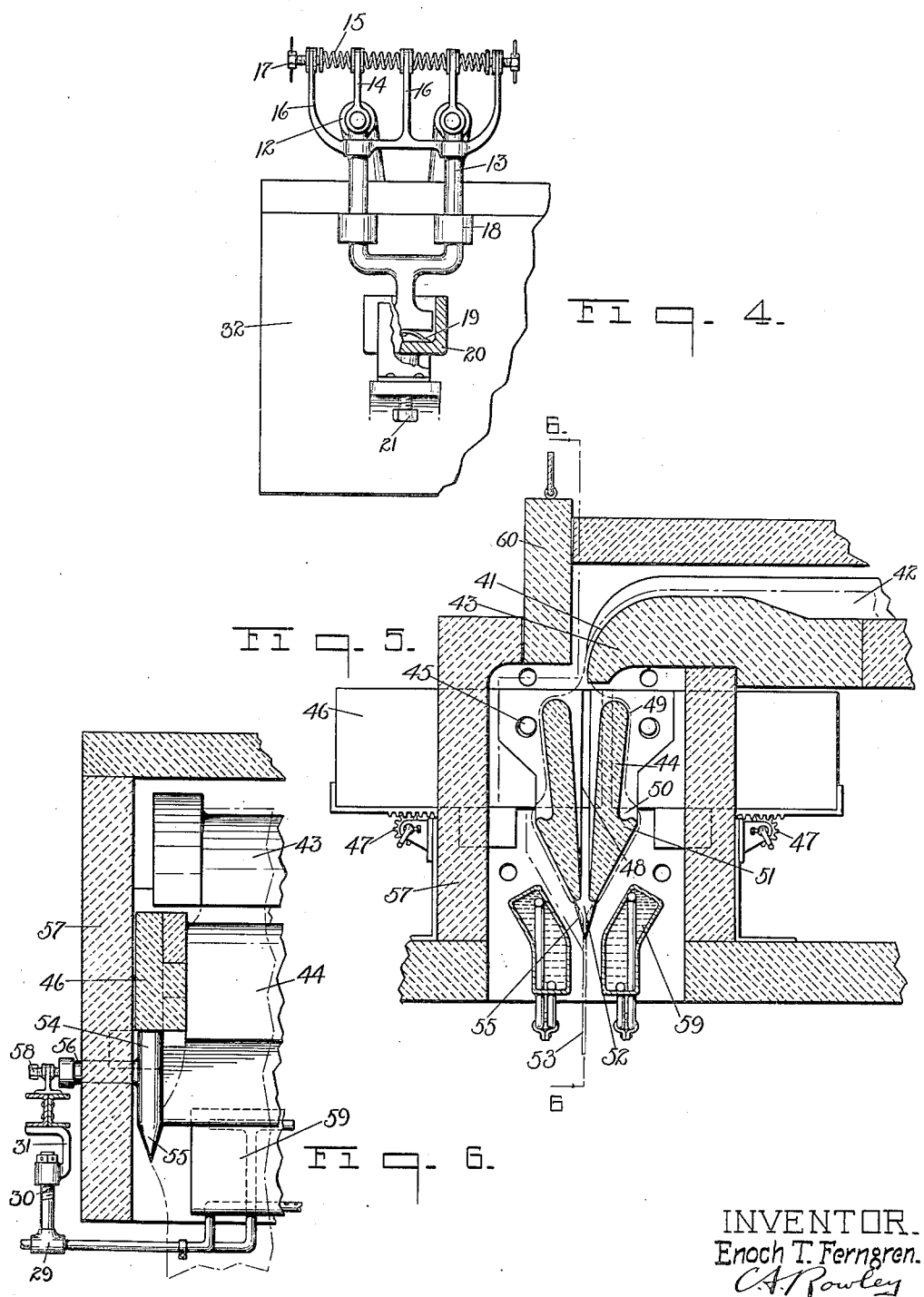

Patented Oct. 27, 1931

1,829,640

UNITED STATES PATENT OFFICE

ENOCH T. FERNGREN, OF TOLEDO, OHIO, ASSIGNOR TO LIBBEY-OWENS-FORD GLASS COMPANY, OF TOLEDO, OHIO, A CORPORATION OF OHIO

METHOD AND APPARATUS FOR FORMING SHEET GLASS

Application filed March 24, 1924, Serial No. 701,305. Renewed November 29, 1929.

This invention relates to the art of making sheet glass, and more particularly to a process and apparatus for flowing and drawing molten glass downwardly into sheet form.

The molten glass used in this process, although fluid, is in a state of advanced plasticity so as to have a rather sluggish downward discharge movement. To provide internal support for this glass stream a pair of guiding or supporting tiles are so mounted that the flow of glass will be divided into a main central column passing between the tiles, and two lesser side streams which merge with the central column at the lower end of the supporting tiles where, under one form of operation, the surface layers of the combined glass flow are progressively chilled by artificial cooling means arranged adjacent thereto, while said surfaces and the under drawing-stress-attenuating body of the flow are simultaneously drawn away from the supporting members in the form of a glass sheet.

The above and other features, and the objects and advantages of the invention will be more clearly understood after reading the following detailed description of two approved forms of the apparatus.

In the accompanying drawings:

Fig. 4 is a side view showing the supporting means for the directing tiles.

Fig. 5 is a vertical section, similar to Fig. 1, through a modified form of the apparatus.

Fig. 6 is a partial transverse vertical section taken substantially on the line 6—6 of Fig. 5.

Figure 1:
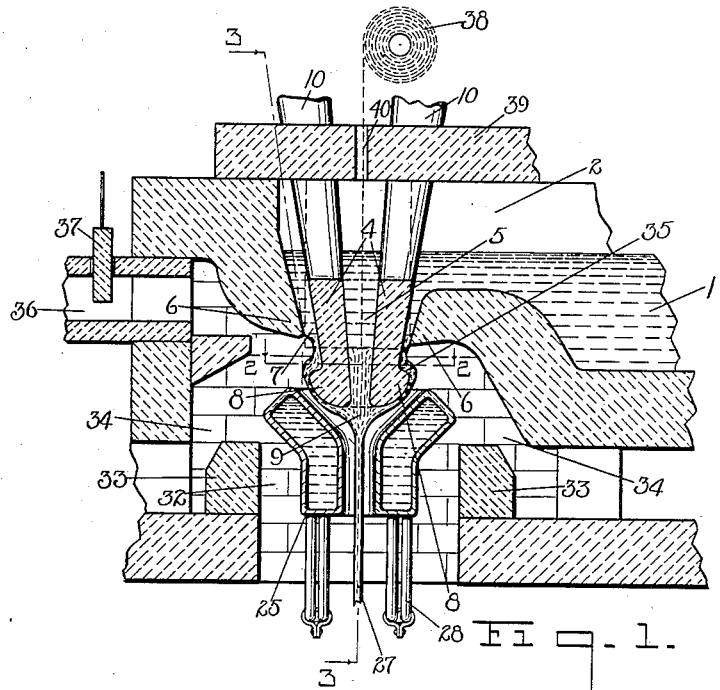
Fig. 1 is a longitudinal vertical section through one form of the apparatus.

Referring first to the form of apparatus shown in Figs. 1 to 4, inclusive, the molten glass 1 flows from the melting furnace or other source of supply, through suitable refining chambers, into the rather shallow discharge receptacle or bowl 2, having a wide discharge orifice in its lower side. A pair of similar directing and supporting tiles 4 extend from within the molten glass down through this discharge orifice. The inner adjacent sides of these tiles are substantially plane smooth surfaces and are normally so spaced so as to provide an open passage 5 therebetween through which the main central vertical column of glass flows downwardly to the sheet source. Between the outer face of each tile 4 and the adjacent edge 6 of the receptacle 2, is a narrow passage 7 through which a shallower stream of molten glass flows down along the outer face of the directing tile. Each tile 4 adjacent its lower end is provided with an outwardly extending ridge or shelf 8, each of which provides a means for accumulating a supply of molten glass and temporarily supporting the same on the outer side of the tile member before it flows around the inwardly curving lower end of the tile to merge with the central stream 2 and form the body of glass 9 at the sheet source.

Each supporting tile 4, adjacent each end, has an upwardly extending supporting column 10. The columns 10 are secured to a transverse supporting shaft 11 mounted at its ends in bearings 12 in a supporting frame 13. At the extreme outer end of shaft 11 is secured an upwardly extending lever arm 14 mounted between a pair of compression springs 15 which bear at their outer ends against upwardly extending bracket arms 16 on supporting frame 13. By means of adjusting screw 17, the tension of these springs 15 may be regulated. As will be noted from Fig. 4, the two tiles 4 are similarly supported in the same frame 13, this frame being vertically slidable through guides 18 at the side of the machine, and carried at its lower end on a spring 19 in adjustable supporting cup 20 carried at the upper end of an adjusting screw 21. By means of screws 21, the pair of tiles 4 may be adjusted vertically to the desired position within the discharge orifice, and springs 19 will always allow the tiles to yield vertically to a certain extent under unusual pulling strains. The springs 15, which yieldably hold the tile members in their normal angular position within the discharge orifice, will permit the tiles to yield toward or from one another in response to variations in the drawing stresses, as more particularly described hereinafter.

Figures 2, 3:
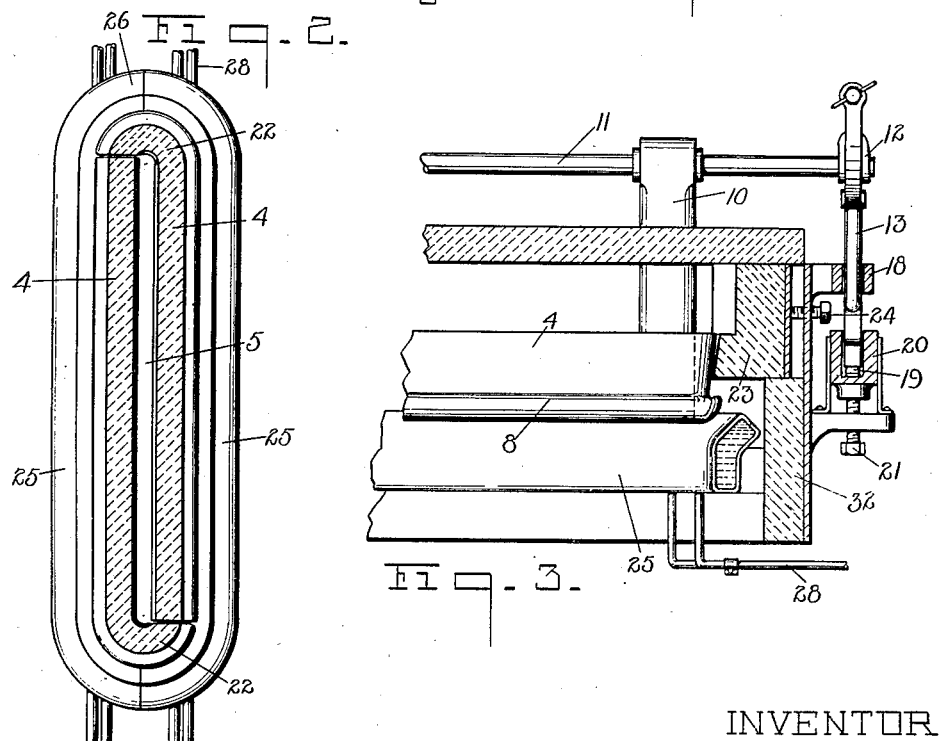
Fig. 2 is a horizontal section taken substantially on the line 2—2 of Fig. 1.
Fig. 3 is a transverse section through a portion of the apparatus taken substantially on the line 3—3 of Fig. 1. In this view the flowing glass has been omitted in order to more clearly show the construction.

Adjacent the lower edge, each tile 4 is provided at one end with a curved extension 22, as shown in Fig. 2, which overlaps the adjacent end of the other tile 4 to form a practically complete loop enclosing the main central passage 5. At the same time these rounded ends form a continuous guiding surface for the outer flow of glass which may flow around these ends to join the two outer streams 7. Adjacent the ends of the upper portions of tiles 4, are inwardly adjustable blocks or tiles 23, mounted in the side walls of the enclosing structure and adjustable laterally by means of screws 24. These tiles 23 serve to guide the upper portions of the glass streams which flow down the ends of the directing tiles 4 and to determine their respective quantity and speed while flowing over the extension 22 and the shelf 8.

Arranged closely adjacent the mass of glass 9 formed by the three merging downwardly flowing streams of glass at the lower ends of tiles 4, is a pair of internally water-cooled shields 25. These shields curve inwardly at their ends 26 so as to form practically a complete loop about the lower faces of the tiles and the source of glass sheet 27 which is drawn downwardly between the coolers. Each cooler is supported adjacent its ends by a pair of pipe members 28, the cooling water flowing in through one of these pipes and the heated water discharging through the other. As shown more particularly in Fig. 6, each pair of these pipes may be supported in a hanger 29 adjustably carried by screwbolt 30 in bracket 31.

The entire apparatus beneath the discharge orifice, as above described, is enclosed in a temperature regulating housing 32. The inner vertical partitions 33 in this housing direct heated gases through passages 34 upwardly against the two outer streams of glass and particularly against the supplies of glass 35 which accumulate upon the shelves 8 already described. An outlet flue 36 for these heating gases may be regulated by means of vertically adjustable damper 37.

The molten glass in receptacle 2 is at a sufficiently low temperature so that it will normally flow downwardly in a rather sluggish manner through the free central passage 5, but its speed will be increased by the drawing action of the sheet 27 which is being drawn away from the sheet source 9 at the lower ends of the tiles 4. The shallower streams of glass 7 flowing down the outer sides of slabs 4 will be heated and rendered more fluid and freely movable by the heated gases directed thereon through passages 34. The supplies of more highly heated glass thus maintained on the ledges 8 will flow rather freely into the outer surfaces of the sheet, but this glass, as well as the adjacent outer portion of the main central flow exudation from the glass in the central passage 5, will be quickly chilled and rendered quite tough and plastic by the coolers 25 positioned closely adjacent each side of the sheet source 9. The heating of the surface glass of the exterior supplies increases the fluidity of the glass discharge from each body toward the attenuation zone or beginning of the sheet formation which prevents the operation of drawing stress in this glass while the subsequent degree of cooling given to this same glass so changes its consistency that it will operate as a sort of plastic vise extending from the already formed sheet area and including within its grasp the still fluent glass of the tapering meniscus, thus localizing all strains to a particular section of the meniscus base where the compliancy of the glass is relatively great and the strain correspondingly diffused. The sheet 27 is stretched downwardly from this sheet source 9 by any approved form of drawing mechanism.

Since the tile members 4 are mounted in such a way as to be capable of approaching one another during the tractive pull on the glass, the tension created will cause an adjustment in position of the two members in compliance with the stresses acting through the glass. For instance, if the quantity of glass accumulated upon the ledges 8 becomes insufficient to supply the side streams drawn into the sheet edges, there will be manifest a greater amount of drawing stress in the reduced discharge stream from this glass than would be present through the discharge stream from the glass in the central channel 2, and this greater resistance in this outer stream would move the lower ends of the members 4 closer together, causing a reduced and retarded outflow from the central supply body and a greater amount of glass to flow through the side channels 7, which in turn would supply the ledges 8 with a greater amount of glass, and in such a way the properly balanced ratio of the several glass supplies will once more be attained.

An apparatus of this type is also well adapted for making wire glass. As indicated in dotted lines in Fig. 1, a roll of wire mesh 38 may be mounted above the cover-tile 39, and this wire mesh can be drawn down through slot 40 through the molten glass in passage 2 into the interior of the sheet.

In the modified form of the apparatus shown in Figs. 5 and 6, a stream of molten glass 41 flows from a supply 42 over a lip-tile 43 onto the rounded upper edges of a pair of rather closely positioned directing tiles 44, which are similar in many ways to the tiles 4 previously described.

Each of the directing members 44 is supported at its ends, as at 45, upon a longitudinally movable block 46 adjustable through the side wall of the enclosing housing by means of rack and pinion 47. By properly manipulating these pinions the tiles 44 may be moved toward or from one another to vary the width of the passage 48 therebetween.

The molten glass 41 flowing onto the upper ends of the tiles 44 passes in part downwardly through passage 48, and in part overflows the outer sides of the two tiles 44 as thin streams 49 which accumulate in masses 50 upon the supporting ledges 51 along the outer sides of the tiles and then flow downwardly to merge with the central stream 48 at the lower ends of the tiles to form the sheet source 52, from which sheet 53 is run downwardly but with less surface chilling than in the form previously described. A pair of cylindrical vertical tile members 54, preferably provided with pointed lower ends 55, are supported, one at either side of the apparatus, by means of outwardly projecting stems 56 mounted in the adjacent side wall of the housing 57. Each tile 54 may be adjusted in and out by means of screw 58, and is adapted to fit rather closely between the edges of the tiles 44 and act as a guide for the side of the flowing streams passing down between and around these tile members. The cylindrical tile member 54 provides guiding and clinging surfaces to the border supplying glass and aids in giving anchorage to the outer edge of the border glass of the sheet and will also assist in giving the helpful transverse surface tension at the point of formation of the sheet from the suspended meniscus.

Coolers 59, somewhat similar to those previously described, are mounted adjacent to each side of the sheet source to progressively chill the glass during the sheet forming operation. The coolers 59 do not extend around the ends of the glass directing tiles 44 as the glass flowing down at the ends of the tiles is not replenished as readily in this arrangement as in that shown in Figs. 1 to 3, for which reason the glass along the end region of the tiles also becomes less mobile and more susceptible to stiffening if chilled. This condition of the glass, however, is normally of benefit in giving a more firm and less thick body to the border portions of the plastic sheet area, through which border a considerable amount of stretching tension will operate between the set or more unyielding portion of the advancing sheet area and the glass releasing from the supply bodies at the opposite ends of the cooperating tile members 44, resulting in holding the border section of the sheet area very taut and providing a sort of framework between which the main sheet area is held without lateral shrinkage.

The entire mechanism just described is enclosed by a housing 57 in which suitable burners are provided to heat the glass flowing down around the tiles 44, and particularly the glass accumulated on the ledges 51 at the outer sides of the tile. A vertically adjustable gate or damper 60 in the upper part of the housing serves to regulate the heat applied to the stream 41 which flows down from the glass supply upon the directing members.

The arrangement of the apparatus shown in Figs. 1 to 3 lends itself to the control of the downward flow movement of a more plastic glass, almost to the point of overcoming the force of gravity at the meniscus or point of formation of the sheet, and substituting the drawing force which communicates principally through the cooled progressively stabilized surface layers of the meniscus to the merging flow advance from the several supply bodies.

The modification shown in Figs. 5 and 6 is suited for use with a glass of higher temperature and more fluency when the resulting sheet is practically formed by the action of gravity on the suspended portion of the merging stream flows, and the drawing action is more for the purpose of handling and taking away the sheet with but slight supplemental drawing force action to obtain the required thickness of sheet and tautness along the bordering glass of the sheet.

The temperature treatment given to the glass adjacent to and at the point of its tractive deflection toward the line of draw can be employed regardless of the direction in which the glass sheet is drawn, whether downward, upward, sideways, or diagonally from a constantly replenished supply, the main thing arrived at and accomplished in the art through this treatment being that when the surface cooling needed for the sheet formation begins at and is confined to only that portion of the glass which is under direct tractive impellation in the direction of draw and the adjacent replenishing or supplying glass which as yet has not come under direct tractive impulse is maintained in a fluent state or heated to increase its fluency, then the stress and tension incidental to the drawing is limited by the more firm surface layers to that tapering portion of the glass in which the directional progression and momentum in the line of draw is already established and cannot extend to the more liquid or fluent glass, on which there are no firm surface layers to which drawing tension may extend, and as the glass comprising the sheet is thus relieved from conflicting tensional strains between the relatively s ill replenishing glass and the speedily moving drawn glass, the resulting sheet area is singularly free from waves and subsequent warping tendencies providing the supplying glass be of fairly uniform consistency and the resistance to the drawing force which is generated therein be of uniform magnitude.

By advancing a certain sheet feeding quantity of the glass by gravity to the region where the glass is being attenuated by tractive force, while said glass is being associated with the retaining agencies and the orificial directing parts shown, a certain amount of the glass drawing labor to be done by the drawing force will be performed, as measured by the amount of glass put forward in the direction of draw in a given time, which glass is then readily attenuated to the required sheet thickness without the establishment of much tension except along the lines of anchorage given to the inner glass at the edge of each retaining and directing surface, where, on account of the previous adhesion along said surfaces, a glass movement restraining action will occur in opposition to the drawing force. This restraining action, on account of viscosity and cohesiveness of the glass, will establish a glass movement limiting grip on the attenuating glass beyond the retaining and directing surfaces of the directing members, the stress lines of which grip are converging in the direction of draw from about the opposite edge sections of the retaining surfaces which define the slotted orifice between the directing members.

These are the dominant stress or tension lines within the glass and their zone of manifestation is constant and provides a uniform resistance to the drawing force at the point where the glass which is constantly advanced comes under the action of the drawing force.

In either of the structures shown for carrying out the invention and the methods practicable, conditions are provided enabling the formation of supported supply bodies adjacent the point of draw from which bodies thin or reduced glass advances proceed toward a common line or merging zone or are partly assisted and deflected by the drawing force in this direction.

The practical gain resulting from this procedure in part resides in that the stress action during drawing will be confined largely to the glass which is in the merging zone and not extended to the replenishing glass of the supplies along the tile members, thus overcoming the normal functional defect which is present when a reduced quantity of glass is flowed or advanced as a continuous thin lateral stream along the flat sides of downwardly pointing slabs directly to the point of draw without any intermediate supply being formed during such progression of the glass which necessitates high heating of this layer of glass to maintain its fluency, which in turn is productive of an undercoating of tough glass between this layer and the tile slabs causative of fine line formations in the surface of the sheet.

This defect, which depreciates the quality of the produced sheet, is avoided when the glass which supplies the surface layers of the sheet is given a supporting foundation by the ledges on the directing members while being accumulated as a discharging body or supply a close distance from the point of draw, it being mainly the surface or outer portion of each accumulated body which has had no prolonged contact with the surface of the directing member which is being discharged therefrom and forms the flow, which flows subsequently merge at the sheet forming point beneath the slabs.

It may be understood by those who are skilled in the art that a need of providing an extensive clinging surface for a relatively small sheet supplying quantity of glass while heating said quantity in order to have sufficient glass mobility on one hand and clinging resistance to the glass movement on the other hand will not be necessary when the glass flow is checked and supported in the manner shown in the drawings, and that by creating exuding supply bodies an ample supply of glass of normal consistency and grea er cohesiveness and adhesive properties can be retained near the draw-off wedge of each directing member from which bodies a constant quantity will always be released and moved or deflected toward the line of draw, the stress action during drawing on account of the high fluency which can be given to this glass by the surrounding heat action being confined more toward the central and merging portions beneath the directing members.

The extensive clinging and body support given to the central or inner supply body between the directing members relative to its weight and mobility is considerable, for which reason the resistance to the propulsive effect of its static head or column is quite large as is also the resistance to tractive impellation by the drawing force acting through the attenuating meniscus upon the lower portion of the central supply body.

Claims:

1. The method of drawing sheet glass which consists in discharging molten glass downwardly through three separate orifices, in retarding the glass discharging from the two outer orifices to form supply bodies from which thin streams overflow merging the thin streams to form a single downwardly discharging stream of relatively thin body and forming a sheet of glass by applying drawing force to the stream while cooling the opposite faces thereof.

2. The process of drawing a sheet of glass which consists in merging three descending glass streams within a heated zone, in checking the descent of two of the streams above their merging point to increase their quantity adjacent to said point, and in drawing a sheet from the merging point of the glass stream.

3. The process of drawing a sheet of glass downwardly, which consists in forming a suspended body of molten glass, comprising one central and two exposed flows, of plastic consistency in a manner to have one suspending lower zone in and through which the stress tension incidental to drawing may operate, and one upper zone practically free from tension in which the larger portion of the glass composing the body is practically sustained while in a retarded state of progress towards the lower zone, in drawing a sheet of glass from said body while cooling the exterior surfaces along the lower zone and the therewith adjacent sheet area, and so governing the response of the glass comprising said body in the line of its drawn progression by a relative change in volume between the central and the exposed flows, that the stress tension through the lower zone will be uniformly distributed, and the movement of the glass from the upper zone toward the stressed zone, suitably balanced, under conditions of variations in drawing speed.

4. The process of drawing a sheet of glass downwardly, which consists in forming a suspended body of molten glass, comprising one central and two exposed flows of plastic consistency in a manner to have one suspending lower zone, in and through which the stress tension incidental to drawing may operate, and one upper zone practically free from tension in which the larger portion of the glass composing the body is practically sustained while in a retarded state of progress towards the lower zone, in drawing a sheet of glass from said body while cooling the exterior surfaces along the lower zone and the therewith adjacent sheet area, and so governing the response of the glass comprising said body in the line of its drawn progression by a relative change in volume between the central and the exposed flows, that the stress tension through the lower zone, will be uniformly distributed, and the movement of the glass from the upper zone toward the stressed zone suitably balanced under conditions of variations in drawing speed, while simultaneously heating the glass along its upper zone to establish a suitable fluency and less capillary and surface tension capacity therein.

5. In the drawing of a sheet of glass downwardly from a supply, the method of procedure and treatment which consists in forming a freely exposed glass flow of plastic nature, in retarding the flow movement to thereby enlarge its volume slightly above the point where the drawing stress is to be communicated thereto, in heating the flow to give fluency to its surface portions at the point of enlargement, in applying drawing force to the flow, and in so relating the agencies of retardation to the flow and to the drawing stress created therein, that a sufficient sheet supplying quantity will always be available in close proximity to the point of draw.

6. In the drawing of a sheet of glass from a supply, the method which consists in forming an exposed glass flow of plastic nature, in retarding the flow with agencies concealed therein to thereby enlarge its volume slightly above the point where the drawing stress is to be communicated thereto, in heating the flow to give increased fluency to its surface portions at the point where its volume is enlarged, in applying drawing force and forming a sheet area while so relating the agencies of retardation to the flow and to the drawing stress created therein, that a sufficient sheet supplying quantity will always be available in close proximity to the point of draw, irrespective of the speed at which the sheet drawing operation is performed.

7. In an apparatus for forming continuous sheet glass, a pair of similar directing members arranged adjacent one another so as to provide an open passage therebetween, means for flowing molten glass onto the upper edges of the members, the glass flowing down between the members, and also down the outer sides thereof, the three streams uniting below the members and being drawn away in sheet form, the members being provided on their outer faces with means for retaining a supply body of glass in each outer stream adjacent the point where the streams merge, and means for locally cooling the glass where the three streams unite.

8. In an apparatus for forming continuous sheet glass, a pair of similar directing members arranged adjacent one another so as to provide an open passage therebetween, means for flowing molten glass onto the upper edges of the members, the glass flowing down between the members, and also down the outer sides thereof, the three streams uniting below the members and being drawn away in sheet form, the members being provided on their outer faces with means for retaining a supply body of glass in each outer stream adjacent the point where the streams merge, means for applying heat to these glass supplies, and means for locally cooling the glass where the three streams unite.

9. In an apparatus for forming continuous sheet glass, a pair of similar directing members arranged adjacent one another so as to provide an open passage therebetween, means for flowing molten glass onto the upper edges of the members, the glass flowing down between the members, and also down the outer sides thereof, the three streams uniting below the members and being drawn away in sheet form, the members being provided on their outer faces with means for retaining a supply body of glass in each outer stream adjacent the point where the streams merge, and means for movably supporting the members whereby they may move toward or from one another in response to variations in drawing stresses.

10. In an apparatus for forming continuous sheet glass, a pair of directing members between and around which molten glass flows to form a sheet source at the lower ends of the members, and means for supporting the members so that they may yield in the line of draw, and also toward or from one another in response to variations in the sheet drawing stresses.

11. In a glass drawing apparatus, the combination of vertically disposed conforming means down opposite sides of which glass is permitted to flow in film formation, and means for supporting said conforming means whereby it may yield vertically.

12. In a glass drawing apparatus, the combination of substantially vertically disposed conforming means down opposite sides of which glass is caused to flow in film formation, and means for yieldably supporting said conforming means whereby it may yield both vertically and angularly.

13. In apparatus for forming sheet glass, a container for molten glass having a slot in its bottom, a two part substantially vertically disposed conforming member adapted to receive glass flowing through said slot and form it into a sheet, and means for supporting said conforming member whereby it may yield vertically.

14. In apparatus for forming sheet glass, a container for molten glass having a slot in its bottom, a two part substantially vertically disposed conforming member adapted to receive glass flowing through said slot and form it into a sheet, and means for yieldably supporting said conforming member whereby it may yield vertically and also angularly with respect to the plane of said slot.

15. In glass drawing apparatus, the combination of pivotally mounted, substantially vertically disposed conforming means down opposite sides of which glass is caused to flow in film formation, and means for supporting said conforming means whereby it may yield vertically.

16. In apparatus for forming sheet glass, a container for molten glass having a slot in its bottom, a two part substantially vertically disposed, pivotally mounted conforming member through and around which molten glass is adapted to flow downwardly from said slot, means for supporting said conforming member whereby it may yield vertically, and means for holding the two parts of said conforming members yieldably against the glass flowing therebetween.

Signed at Toledo, in the county of Lucas and State of Ohio, this 22d day of March, 1924.

ENOCH T. FERNGREN.